United States Patent [19]

Brunelle

[11] Patent Number: 5,648,454
[45] Date of Patent: Jul. 15, 1997

[54] PROCESS FOR PRODUCING HIGH DUCTILE POLYESTERS

[75] Inventor: Daniel Joseph Brunelle, Burnt Hills, N.Y.

[73] Assignee: General Electric Company, Schenectady, N.Y.

[21] Appl. No.: 600,643

[22] Filed: Feb. 14, 1996

[51] Int. Cl.$^6$ ................................. C08F 6/00; C08J 3/00
[52] U.S. Cl. ..................... 528/491; 528/274; 528/279; 528/283; 528/481; 528/490.5; 528/503; 525/437; 524/755; 524/783; 524/784
[58] Field of Search ................................ 528/274, 279, 528/283, 481, 490, 491, 503; 525/437; 524/755, 783, 784

[56] References Cited

U.S. PATENT DOCUMENTS

| | | |
|---|---|---|
| 5,039,783 | 8/1991 | Brunelle et al. . |
| 5,300,590 | 4/1994 | Cook et al. . |
| 5,386,037 | 1/1995 | Takekoshi et al. . |
| 5,466,744 | 11/1995 | Evans et al. . |

*Primary Examiner*—Samuel A. Acquah
*Attorney, Agent, or Firm*—William H. Pittman

[57] ABSTRACT

A process for making high ductile and high melting point polyesters comprising the step of contacting macrocyclic copolyester oligomers having structural units with $C_4$ alkylene bridging radicals and structural units with bridging radicals other than $C_4$ alkylenes, and a polymerization catalysts.

15 Claims, No Drawings

PROCESS FOR PRODUCING HIGH DUCTILE POLYESTERS

This invention was made with government support under Contract No. 70NANB2H1237 awarded by the U.S. Government. The government has certain rights in this invention.

FIELD OF THE INVENTION

This invention is directed to a novel process for making polyesters from macrocyclic copolyester oligomers. More particularly, the process employs the step of polymerizing macrocyclic copolyester oligomers to, for example, unexpectedly produce polyesters displaying high ductility and favorable melting points. In addition to the above, the process does not interfere with the overall rate of the polyester production.

BACKGROUND OF THE INVENTION

Polyesters such as poly(alkylene terephthalates) are well known commercially available polymers. They have valuable characteristics including strength, toughness, high gloss and solvent resistance. Polyesters are commercially prepared by the reaction of diols with functional derivatives of dicarboxylic acids, diacid halides or esters. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. The desired properties stem from the fact that macrocyclic polyester oligomers exhibit low viscosities when compared to those of corresponding polymers. Such low viscosities allow them to easily impregnate dense fibrous preforms.

As a result of their properties, and particularly their low viscosities, it has been of increasing interest to utilize macrocyclic polyester oligomers as precursors for branched and linear polyesters. This is true because macrocyclic polyester oligomers may first be employed to fill a preform, and subsequently polymerized to polyesters displaying the above-mentioned properties.

Notwithstanding the above, when preparing materials from polyester precursors, such as oligomers, the resulting polyesters typically display an increase in crystallinity which invariably diminishes their characteristic favorable properties, including ductility.

It is of increasing interest, therefore, to make polyesters via a process which results in polymer having high melting points and favorable physical properties without interfering with their overall rate of production.

DESCRIPTION OF THE PRIOR ART

Efforts have been disclosed for preparing polyesters. In U.S. Pat. Nos. 5,387,666 and 5,039,783, the disclosures of which are incorporated herein by reference, tin catalysts are employed for the preparation of polyesters from macrocyclic polyester oligomers.

Other investigators have focused on the preparation of polyesters. In U.S. Pat. No. 5,466,744, polyesters are prepared by contacting macrocyclic polyester oligomers and a polymerization catalyst at a temperature within the range of about 160°–300° C.

Additionally, attempts have been made to make polyesters with improved integrity. In U.S. Pat. No. 5,300,590, a method for making polyesters from blend compositions is described

SUMMARY OF THE INVENTION

In a first aspect, the instant invention is directed to a process for producing polyesters comprising the step of contacting:

(a) a macrocyclic copolyester oligomer; and (b) a polymerization catalyst, wherein said macrocyclic copolyester oligomer comprises structural units of the formula

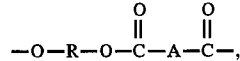

and R is a bridging radical selected from the group consisting of alkylenes, aliphatic groups and aromatic groups, with the proviso that the oligomer comprises structural units not having identical bridging radicals. A is a m- or p-linked aromatic or alicyclic radical.

In a second aspect, the instant invention is directed to a process for producing high ductile and high melting point polyesters comprising the step of contacting:

(a) a macrocyclic copolyester oligomer; and (b) a polymerization catalyst, wherein said macrocyclic copolyester oligomer comprises structural units of the formula

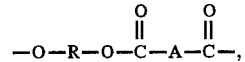

and R is a bridging radical selected from the group consisting of an alkylenes, aliphatic groups and aromatic groups, with the proviso that the oligomer comprises structural units with $C_4$ alkylene bridging radicals and structural units with bridging radicals other than $C_4$ alkylenes, and have greater than about 2.0 mole percent and less than about 8.0 mole percent of bridging radicals other than $C_4$ alkylenes based on total moles of bridging radicals present in the oligomer. A is a m- or p-linked aromatic or alicyclic radical.

In a third aspect, the instant invention is directed to the polyesters prepared via the method described in the second aspect of this invention.

Additionally, high ductility as used herein is defined to mean a polyester associated with a heat of melting of less than about 70.0 J/g and preferably less than about 65.0 J/g and most preferably less than about 60.0 J/g as measured by differential scanning calorimetry. Favorable melting points are defined herein to mean melting points greater than about 210° C. and preferably greater than about 215° C. and most preferably greater than about 220° C. Moreover, it is also noted herein that it has been unexpectedly discovered that when conducting the process described in the second aspect of this invention, it is not necessary to raise the reaction temperature above about 210° C. due to the melting point of the macrocyclic copolyester oligomers.

DETAILED DESCRIPTION OF THE PREFERRED EMBODIMENTS

The macrocyclic copolyester oligomers employed in this invention are generally not limited to any class; however, they are often those of the family consisting of polymeric glycol terephthalates or isophthalates. They are typically characterized by an Mn value of less than about 2000 but preferably about 300 to about 1500. Preferred macrocyclic copolyester oligomers employed in the instant invention are those comprising $C_2$ and $C_4$ alkylenes and therefore structural units derived from poly(ethylene terephthalate) (PET) and poly (1,4-butylene terephthalate) (PBT).

The macrocyclic copolyester oligomers may be prepared by a method which comprises contacting diols of the formula HO—R—OH and diacid chlorides of the formula

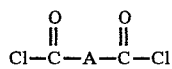

under substantially anhydrous conditions and in the presence of a substantially water immiscible organic solvent, with at least one unhindered tertiary amine; said contact being conducted at a temperature from about −25° to about +25° C., wherein R and A are as defined above.

Other reagents used to synthesize the macrocyclic poly (alkylene dicarboxylate) oligomers employed in the instant invention include unhindered tertiary amines and substantially water-immiscible organic solvents. A detailed description for the preparation of the above-mentioned macrocyclic copolyester oligomers employed in this invention may be found in commonly assigned U.S. Pat. Nos. 5,386,037, 5,387,666 and 5,389,719, the disclosures of which are incorporated herein by reference.

Moreover, an additional method for preparing such macrocyclic copolyester oligomers includes one which depolymerizes/fragments linear polymers in the presence of a tin catalyst. A more detailed description of such a method may be found in commonly assigned U.S. Pat. No. 5,487, 984, the disclosure of which is incorporated herein by reference.

There is no limitation with respect to the catalysts which may be employed in this invention other than that they are those which are capable of accelerating the polymerization of the macrocyclic polyester oligomers described above.

The often employed catalysts include organotin compounds and titanate catalysts. Illustrative organotin compounds are dialkyltin(IV) oxides such as di-n-butyltin(IV) oxide and di-n-octyltin oxide and acyclic and cyclic dialkyltin(IV) dialkoxides such as di-n-butyltin(IV) di-n-butoxide and 2,2-di-n-butyl-2-stanna-1,3-dioxacycloheptane tributyltin ethoxide. Illustrative titanate catalysts include isopropyl titanate, 2-ethylhexyl titanate, tetrakis-(2-ethylhexyl)titanate and titanium(IV) 2-ethylhexoxide.

Other catalysts which may be employed in this invention include dialkyltin alkoxides, stannaoxacycloalkanes and spirotin compounds. Such other catalysts are described in U.S. Pat. No. 5,407,984, the disclosure of which is incorporated herein by reference.

When conducting the instant novel process as set forth in the first and second aspect of this invention, a reaction vessel, for example, may be charged with the macrocyclic copolyester oligomers and polymerization catalyst, the order of addition not being material to this invention. Heat is supplied to melt the oligomers to be polymerized and stirring may be employed under an inert gas in order to enhance the polymerization of the oligomers to produce the desired polymer. In a preferred embodiment of this invention, however, additionally, it is in the scope of the invention to dissolve the polymerization catalysts in a solvent such as o-dichlorobenzene in order to enhance mixing.

Furthermore, when conducting the processes as defined in the first and second aspects of this invention, the temperature at which the polymerizations are conducted can be greater or less than the melting point of the resulting polymers and is often about 135° C. to about 270° C. Preferably, however, when conducting the process as set forth in the second aspect of this invention, the temperature at which the polymerization occurs is unexpectedly and typically less than the melting point of the resulting polymers and often about 170° C. to about 210° C.

It is further within the scope of this invention to employ conventional fillers, additives and support matrices. Such fillers, additives and support matrices may be added, for example, to the macrocyclic copolyester oligomers prior the addition of polymerization catalysts, wherein the only proviso being that conditions allow for the polymerization of the macrocyclic copolyester oligomers. Illustrative examples of the fillers, additives and support matrices which may be employed include impact modifiers, pigments, talc, clays, and support fibers like glass and carbon fibers. It should also be noted herein that in-situ polymerization in a mold or preform, for example, is certainly within the scope of this invention.

Subsequent to the polymerization of the macrocyclic copolyester oligomers, the resulting polymers are linear and/or branched copolyesters.

The following examples are provided to further illustrate and facilitate and understanding of the instant invention. The products obtained may be confirmed by conventional techniques such as proton and carbon-13 nuclear magnetic resonance spectroscopy, mass spectroscopy, infrared spectroscopy and GPC analysis.

Example 1

A 2 L, 3-necked round bottom flask was dried in an oven and kept dried by sparging with nitrogen while it was fitted with a mechanical stirrer, a Claisen head with a reflux condenser and rubber septa. The flask was charged with 900 mL of dry $CH_2Cl_2$, 1.12 g of diazabicyclo[2.2.2]octane (10 mmol), and 61 mL of triethylamine (440 mmol), while the nitrogen purge was maintained. Using two metered peristaltic pumps, 200 mL of a 1.0 M solution of terephthaloyl chloride (TPC) in dry $CH_2Cl_2$ and a mixture of ethylene glycol and 1,4-butanediol (in a 2/98 mole % ratio, respectively) were fed simultaneously to produce a reaction mixture. For this reaction, 30.5 cm stainless steel needles inserted into the septa provided the necessary means for reagent input. The addition of reagents was carried out over 1 hour, at which point a 1 mL sample was drawn for analysis. When linear oligomers were detected by HPLC, additional TPC was added to convert any alcohol functionalities generated to carboxylic acid halides in order to facilitate pure product formation.. The resulting product was quenched with water, washed with aq. $NH_4OH$, subsequently washed consecutively with 3N HCl, 1N HCl, then with water 3 times. The $CH_2Cl_2$ solution obtained was filtered, dried with $MgSO_4$ and then with silica gel, both employed in amounts to absorb water and carboxylic acid terminated linear oligomers. Finally, the solution was filtered again, and evaporated to yield a white powder. The powder obtained was a (PET/PBT) macrocyclic copolyester oligomer, Mn approximately 800.

Example 2

PET/PBT macrocyclic copolyester oligomers (5.00 g) were added to a 25 ml round-bottom flask equipped with a 2.5 cm magnetic stir bar and a nitrogen/vacuum adaptor. The oligomers were dried by heating at 100° C. under 1 mm vacuum for 10 minutes, then were melted via an oil bath at 180°–190° C. under 1 mm vacuum for 10 minutes. After releasing the vacuum with nitrogen, tetrakis-(2-ethylhexyl) titanate initiator was added, usually as a solution o-dichlorobenzene. The resulting reaction mixture stopped due to an increase in polymer viscosity within 2–10 sec. After the stirrer stopped, heating was continued under nitrogen for 25–45 minutes. Crystallization of the resulting polymerized copolyester began within 5–15 minutes, and the resulting crystallized reaction product was a white solid. After removing from the oil bath and cooling the polymer to ambient temperature, the reaction flask was broken to remove the product polymer, which was analyzed by gel permeation chromatography (GPC), with percent polymerization and molecular weights calculated relative to polystyrene standards. The product obtained had a melting point of 225° C., a Mw of about 133,000 and a heat of melting of about 67 J/g.

The data in the table below depicts the unexpected and improved results obtained via the process described in this invention; especially that polyester polymer with a melting point of greater than about 215° C. and a heat of melting of less than about 70 J/g may be produced from macrocyclic copolyester oligomers.

TABLE

| Entry | PET/PBT[A] Ratio in Oligomer | % Polymerization | Polymer Mw | Polymer Melting Point (°C.) | Polymer heat of Melting (J/g) |
|---|---|---|---|---|---|
| Control | 0/100 | 96 | 143,900 | 228 | 69.1 |
| 1 | 1/99 | 98 | 90,400 | 226 | 68.6 |
| 2 | 3/98 | 97 | 113,000 | 224 | 64.4 |
| 3 | 5/95 | 98 | 167,400 | 220 | 59.0 |
| 4 | 7/93 | 99 | 110,000 | 217 | 57.4 |
| 5 | 8/92 | 98 | 96,600 | 217 | 57.1 |
| 6 | 10/90 | 94 | 79,700 | 214 | 47.8 |
| 7 | 10/90[B] | — | — | — | — |
| 8 | 100/00[C] | — | — | — | — |

[A]Entries 1–6: macrocyclic copolyester oligomers (mole % ratio) with melting points at about 175° C.
[B]Entry 7: macrocyclic polyester mixture with melting point in excess of 225° C.
[C]Entry 8: macrocyclic PET oligomer, and melting point in excess of 300° C.

What is claimed is:

1. A process for producing high ductile and high melting point polyesters comprising the step of contacting:
   (a) a macrocyclic copolyester oligomer; and
   (b) a polymerization catalyst,
wherein said macrocyclic copolyester oligomer comprises structural units of the formula

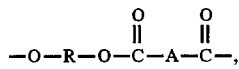

and R is a bridging radical selected from the group consisting of an alkylenes, aliphatic groups and aromatic groups, with the proviso that the oligomer comprises structural units with C$_4$ alkylene bridging radicals and structural units with bridging radicals other than C$_4$ alkylenes, and have greater than about 2.0 mole percent and less than about 8.0 mole percent of bridging radicals other than C4 alkylenes based on total moles of bridging radicals present in the oligomer, and A is a m- or p-linked aromatic or alicyclic radical.

2. A process for producing polyesters in accordance with claim 1 wherein said polymerization catalysts are organotin compounds or titanate compounds.

3. A process for producing polyesters in accordance with claim 2 wherein said organotin compounds are dialkyltin (IV) oxides or acyclic or cyclic dialkyltin(IV) dialkoxides, and said titanate compounds are isopropyl titanate, 2-ethylhexyl titanate, tetrakis-(2-ethylhexyl)titanate or titanium(IV) 2-ethylhexoxide.

4. A process for producing polyesters in accordance with claim 1 wherein said process is conducted at a temperature of about 170° C. to about 210° C.

5. A process for producing polyesters in accordance with claim 1 wherein said polyesters have a heat of melting of less than about 70 J/g.

6. A process for producing polyesters in accordance with claim 1 wherein said polyesters have a melting point of greater than about 210° C.

7. A process for producing polyesters in accordance with claim 1 wherein said macrocyclic copolyester oligomers have an average number molecular weight of less than about 2000.

8. A process for producing polyesters in accordance with claim 1 wherein said macrocyclic polyester oligomers comprise structural units derived from poly(ethylene terephthalate) and poly(1,4-butylene terephthalate) and said polyesters are copolyesters comprising structural units derived from poly(ethylene terephthalate) and poly(1,4-butylene terephthalate).

9. A process for producing polyesters in accordance with claim 1 wherein said polymerization catalyst is first dissolved in a solvent prior to polymerizing the macrocyclic copolyester oligomers.

10. A process for producing polyesters in accordance with claim 9 wherein said solvent is o-dichlorobenzene.

11. A process for producing polyesters in accordance with claim 1 wherein said process further comprises the step of stirring the macrocyclic copolyester oligomer and polymerization catalyst to enhance polymerization.

12. A polyester prepared by the method in claim 6 and comprising structural units of the formula

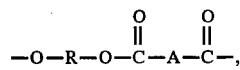

and R is a bridging radical selected from the group consisting of an alkylenes, aliphatic groups and aromatic groups, with the proviso that the oligomer comprises structural units with C$_4$ alkylene bridging radicals and structural units with bridging radicals other than C$_4$ alkylenes, and have greater than about 2.0 mole percent and less than about 8.0 mole percent of bridging radicals other than C$_4$ alkylenes based on total moles of bridging radicals present in the oligomer, and A is a m- or p-linked aromatic or alicyclic radical.

13. A polyester in accordance with claim 12 wherein said polyester has a melting point of greater than about 210° C.

14. A polyester in accordance with claim 12 wherein said polyester has a heat of melting of less than about 70 J/g.

15. A polyester in accordance with claim 12 wherein said polyester comprises structural units derived from poly (ethylene terephthalate) and poly(1,4-butylene terephthalate).

* * * * *